(12) United States Patent
Baumgart et al.

(10) Patent No.: US 11,232,713 B2
(45) Date of Patent: Jan. 25, 2022

(54) SYSTEMS, METHODS, APPARATUSES, AND DEVICES FOR IDENTIFYING, TRACKING, AND DETERRING UNMANNED AERIAL VEHICLES VIA ADS-B SIGNALS

(71) Applicant: Dedrone Holdings, Inc., San Francisco, CA (US)

(72) Inventors: Kai Baumgart, Kassel (DE); Rene Seeber, Kassel (DE)

(73) Assignee: Dedrone Holdings, Inc., San Francisco, CA (US)

( * ) Notice: Subject to any disclaimer, the term of this patent is extended or adjusted under 35 U.S.C. 154(b) by 0 days.

(21) Appl. No.: 16/863,515

(22) Filed: Apr. 30, 2020

(65) Prior Publication Data

US 2021/0343165 A1 Nov. 4, 2021

(51) Int. Cl.
| | |
|---|---|
| *G08G 5/00* | (2006.01) |
| *G01S 19/51* | (2010.01) |
| *G01S 19/01* | (2010.01) |
| *G08G 5/04* | (2006.01) |
| *B64C 39/02* | (2006.01) |

(52) U.S. Cl.
CPC .......... *G08G 5/0043* (2013.01); *G01S 19/015* (2013.01); *G01S 19/51* (2013.01); *G08G 5/006* (2013.01); *G08G 5/0013* (2013.01); *G08G 5/0052* (2013.01); *G08G 5/045* (2013.01); *B64C 39/024* (2013.01)

(58) Field of Classification Search
CPC .. G08G 5/0013; G08G 5/0026; G08G 5/0043; G08G 5/0052; G08G 5/006; G08G 5/045; G01S 19/15
See application file for complete search history.

(56) References Cited

U.S. PATENT DOCUMENTS

| | | | |
|---|---|---|---|
| 9,689,976 B2 | 6/2017 | Parker et al. | |
| 9,715,009 B1 | 7/2017 | Parker et al. | |
| 9,977,117 B2 | 5/2018 | Parker et al. | |
| 10,043,405 B1* | 8/2018 | Chartier | G08G 5/0021 |
| 10,156,631 B2 | 12/2018 | Parker et al. | |
| 10,281,570 B2 | 5/2019 | Parker et al. | |

(Continued)

FOREIGN PATENT DOCUMENTS

WO 20160122739 A2 8/2016

*Primary Examiner* — Andrew W Bee
(74) *Attorney, Agent, or Firm* — Morris, Manning & Martin, LLP; Daniel E. Sineway; Adam J. Thompson

(57) ABSTRACT

Systems, methods, apparatuses, and devices for identifying, tracking, and deterring UAVs via ADS-B signals are disclosed. The system leverages a plurality of sensors operatively connected over a network to a configuration of software and/or hardware for detecting approaching UAVs. In response to detecting approaching UAVs, the system generates and propagates ADS-B signals to be received by the UAVs for deterring the UAVs from entering a particular airspace, wherein the particular airspace is indicated by data encoded within the ADS-B signal. According to particular aspects of the present disclosure, the ADS-B signals can be propagated continuously or on-demand. Furthermore, the ADS-B signals may be generated based on real-time GPS data, or the ADS-B signals may be generated based on "spoofed" or hard-coded location data, for disguising a particular ADS-B signal as being transmitted from a different location.

16 Claims, 7 Drawing Sheets

(56) References Cited

U.S. PATENT DOCUMENTS

| | | | |
|---|---|---|---|
| 10,302,759 B1* | 5/2019 | Arteaga | G08G 5/0082 |
| 10,505,622 B1* | 12/2019 | Stein | G08G 5/04 |
| 10,670,696 B2 | 6/2020 | Parker et al. | |
| 10,739,451 B1 | 8/2020 | Parker et al. | |
| 10,795,010 B2 | 10/2020 | Parker et al. | |
| 10,907,940 B1 | 2/2021 | Parker et al. | |
| 2008/0036659 A1* | 2/2008 | Smith | G08G 5/0082 |
| | | | 342/454 |
| 2010/0315281 A1* | 12/2010 | Askelson | G01S 13/91 |
| | | | 342/30 |
| 2011/0273322 A1* | 11/2011 | Melum | H04W 4/029 |
| | | | 342/42 |
| 2014/0327564 A1* | 11/2014 | Sampigethaya | G08G 5/0013 |
| | | | 342/32 |
| 2015/0193101 A1* | 7/2015 | Mannon | G01S 13/931 |
| | | | 715/771 |
| 2015/0331099 A1* | 11/2015 | Wu | G08G 5/0008 |
| | | | 342/32 |
| 2017/0103659 A1* | 4/2017 | Jin | B64C 39/024 |
| 2017/0148332 A1* | 5/2017 | Ziemba | H04W 12/041 |
| 2017/0278404 A1* | 9/2017 | Gordon | G08G 5/0069 |
| 2017/0358214 A1* | 12/2017 | Scarlatti | G08G 5/0013 |
| 2019/0019420 A1* | 1/2019 | X et al. | G08G 5/0026 |
| 2019/0266904 A1* | 8/2019 | Kant | G08G 5/0021 |
| 2020/0353894 A1* | 11/2020 | Obaidi | G05D 1/021 |

* cited by examiner

SYSTEMS, METHODS, APPARATUSES, AND DEVICES FOR IDENTIFYING, TRACKING, AND DETERRING UNMANNED AERIAL VEHICLES VIA ADS-B SIGNALS

TECHNICAL FIELD

The present disclosure relates generally to identifying, tracking, and deterring unmanned aerial vehicles using a plurality of sensors, computer hardware, and computer software, and more specifically using the ADS-B communication protocol to accomplish the same.

BACKGROUND

Unmanned Aerial Vehicles (UAVs), often referred to as "drones", are generally aircrafts operated without the presence of an onboard pilot. UAVs vary in size and may be controlled in real-time from a remote location, or they may be configured to operate autonomously. The introduction and growing popularity of UAVs has raised issues regarding government regulations and the allowable usage of UAVs.

The anonymous nature of UAVs has introduced problems in areas where accountability and identity are of the utmost importance. Locations such as airports, prisons, sporting venues, residential homes, etc., are among these areas that require a safe and regulated airspace around their perimeters, and UAVs compromise the ability to ensure the safety of such airspaces.

Therefore, there is a long-felt but unresolved need for a system, method, apparatus, and/or device that is designed to detect, identify, track, and deter UAVs or other aircrafts in order to better protect airspaces and the areas they surround.

BRIEF SUMMARY OF THE DISCLOSURE

Briefly described, and according to one embodiment, aspects of the present disclosure relate generally to systems, methods, apparatuses, and devices for identifying, tracking, managing, and deterring unmanned aerial vehicles (UAVs) using a plurality of sensors, hardware, and software. In one embodiment, and in accordance with aspects of the present disclosure, a plurality of sensors including at least radar, video, audio, Wi-Fi, infrared, and radio frequency (RF) sensors, collect data from their surrounding environments in order to detect, identify, track, and manage UAVs. In a particular embodiment, one or more sensors/devices transmits and/or receives automatic dependent surveillance broadcast ("ADS-B") signals to and from UAVs, or other aircrafts. In general, ADS-B technology allows for aircrafts to broadcast signals including location data (and other data) to other nearby aircrafts, UAVs, and ADS-B receivers, and to receive signals from those aircrafts/UAVs. Accordingly, ADS-B signals alert aircrafts (or other interested parties) about locations of other nearby aircrafts so that each aircraft can safely occupy their respective airspace by maintaining a safe distance from the flight paths indicated by the ADS-B signals.

According to various aspects of the present disclosure, the system discussed herein may generate one or more fabricated, or "spoofed," ADS-B signals at a location on or near the ground (or otherwise not from an aircraft) for deterring UAVs or other aircrafts. For example, the system may emanate a fabricated ADS-B signal from or near a structure or building. In response to a UAV or aircraft approaching the structure or building, the UAV or aircraft (if equipped with an ADS-B receiver) may receive the ADS-B signal and furthermore avoid the airspace surrounding the structure or building, as the UAV or aircraft interprets the ADS-B signal as indicating "occupied" airspace. In some embodiments, ADS-B equipped aircrafts may be restricted or prohibited (e.g., lawfully) from entering certain airspaces from which an ADS-B signal is emanating (indicating an aircraft presence).

In particular embodiments, the "spoofed" ADS-B signals may include an encoded global positioning system ("GPS") signal position representative of a fabricated aircraft location, such that any aircraft receiving the ADS-B signal would interpret the ADS-B signal as emanating from the fabricated aircraft, thus establishing a "virtual" or fabricated location which the aircraft should avoid. In one embodiment, this fabricated aircraft location may be miles (e.g., 5 miles, 10 miles, 100 miles, etc.) away from the location from which the ADS-B signal was emanated. Furthermore, in at least one embodiment, the ADS-B signals may encapsulate distances ranging hundreds of miles. Accordingly, an approaching aircraft may detect an ADS-B signal hundreds of miles away from the position from which it was emanated, and the ADS-B signal may represent a fabricated aircraft located only a few miles away from the approaching aircraft.

As will be discussed in greater detail herein, the systems, methods, apparatuses, and devices efficiently and optimally protect particular airspaces via unique ADS-B fabricating techniques. The fabricating techniques include generating an ADS-B signal via methods such as hardcoding GPS data into the signal, or capturing real-time GPS data via a GPS sensor positioned at a particular location near the airspace to be protected. Furthermore, the system may emanate a plurality of ADS-B signals from a single sensor, where each of the plurality of ADS-B signals includes GPS data for a different location, such that a single sensor effectively protects a plurality of geographical areas based on fabricated GPS data.

In one embodiment, the present disclosure discusses a system for managing aerial vehicle occupation in a particular airspace, the system including: an ADS-B signal transmitter including a processor, wherein the processor is operable to: generate an ADS-B signal based on location data corresponding to a particular location proximate to the particular airspace, wherein the location data is not associated with any particular aerial vehicle in the particular airspace; and transmit the ADS-B signal, wherein transmitting the ADS-B signal includes propagating the ADS-B signal to be received by one or more aerial vehicles configured to receive the ADS-B signal, whereby in response to receiving the ADS-B signal, the one or more aerial vehicles are alerted to avoid the particular airspace.

In various embodiments, the system further includes a GPS sensor operatively connected to the processor and affixed to a structure with relative proximity to ground level, and wherein the location data is determined in real-time via the GPS sensor. In at least one embodiment, the system further includes a database of predetermined locations, wherein the database of predetermined locations is operatively connected to the processor and includes at least a first location and a last location, and wherein each location in the database of predetermined locations includes location data corresponding to particular locations within the particular airspace. In certain embodiments, the location data corresponding to a particular location proximate to the particular airspace corresponds to the first location. In a particular embodiment, the processor is further operable to: retrieve location data corresponding to a subsequent location from the database; generate a subsequent ADS-B signal based on the location data corresponding to the subsequent location data; and transmit the ADS-B signal over a predetermined time interval. In a particular embodiment, the location data corresponding to the subsequent location includes the last location in the database of predetermined locations. Accordingly to various aspects of the present disclosure, in response to transmitting the location data corresponding to the last location, retrieving again the location data corresponding to the first location for generating and transmitting the associated ADS-B signal. In one embodiment, the predetermined time interval includes about 0.2 seconds. Furthermore, in various embodiments, the ADS-B signal initiates a reroute function at the one or more aerial vehicles in response to being received by the one or more aerial vehicles.

The present disclosure further discusses a method for managing aerial vehicle occupation in a particular airspace via an aerial vehicle collision avoidance signal transmitter including a processor, wherein the processor is configured to execute the method steps, including: generating an aerial vehicle collision avoidance signal based on location data corresponding to a particular location proximate to the particular airspace, wherein the location data is not associated with any particular aerial vehicle in the particular airspace; and transmitting the aerial vehicle collision avoidance signal, wherein transmitting the aerial vehicle collision avoidance signal includes propagating the aerial vehicle collision avoidance signal to be received by one or more aerial vehicles configured to receive the aerial vehicle collision avoidance signal, whereby in response to receiving the aerial vehicle collision avoidance signal, the one or more aerial vehicles are alerted to avoid the particular airspace.

In particular embodiments, the system further includes a GPS sensor operatively connected to the processor and affixed to a structure with relative proximity to ground level, and wherein the location data is determined in real-time via the GPS sensor. In at least one embodiment, the disclosed embodiments further include a database of predetermined locations, wherein the database of predetermined locations is operatively connected to the processor and includes at least a first location and a last location, and wherein each location in the database of predetermined locations includes location data corresponding to particular locations within the particular airspace. In various embodiments, the location data corresponding to a particular location proximate to the particular airspace corresponds to the first location. In certain embodiments, the processor is further operable to: retrieve location data corresponding to a subsequent location from the database; generate a subsequent aerial vehicle collision avoidance signal based on the location data corresponding to the subsequent location data; and transmit the aerial vehicle collision avoidance signal over a predetermined time interval.

According to various aspects of the present disclosure, the location data corresponding to the subsequent location includes the last location in the database of predetermined locations. In various embodiments, in response to transmitting the location data corresponding to the last location, retrieving again the location data corresponding to the first location for generating and transmitting the associated aerial vehicle collision avoidance signal. In certain embodiments, the predetermined time interval includes about 0.2 seconds. In one embodiment, the aerial vehicle collision avoidance signal initiates a reroute function at the one or more aerial vehicles in response to being received by the one or more aerial vehicles. In certain embodiments, the aerial vehicle collision avoidance signal includes ADS-B and/or Mode-S signal data.

Moreover, in one embodiment, the present disclosure discusses a system for managing aerial vehicle occupation in a particular airspace, including: an aerial vehicle collision avoidance signal transmitter; and a processor operatively connected to the aerial vehicle collision avoidance signal transmitter, wherein the processor is configured to: generate a plurality of GPS signals, each GPS signal representative of a particular geolocation at a particular distance away from a protected geolocation, and wherein the totality of the plurality of GPS signals encompass the protected geolocation; and transmit the plurality of GPS signals, wherein the plurality of GPS signals are each transmitted sequentially for a predetermined amount of time.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF FIGURES

Figure 1:
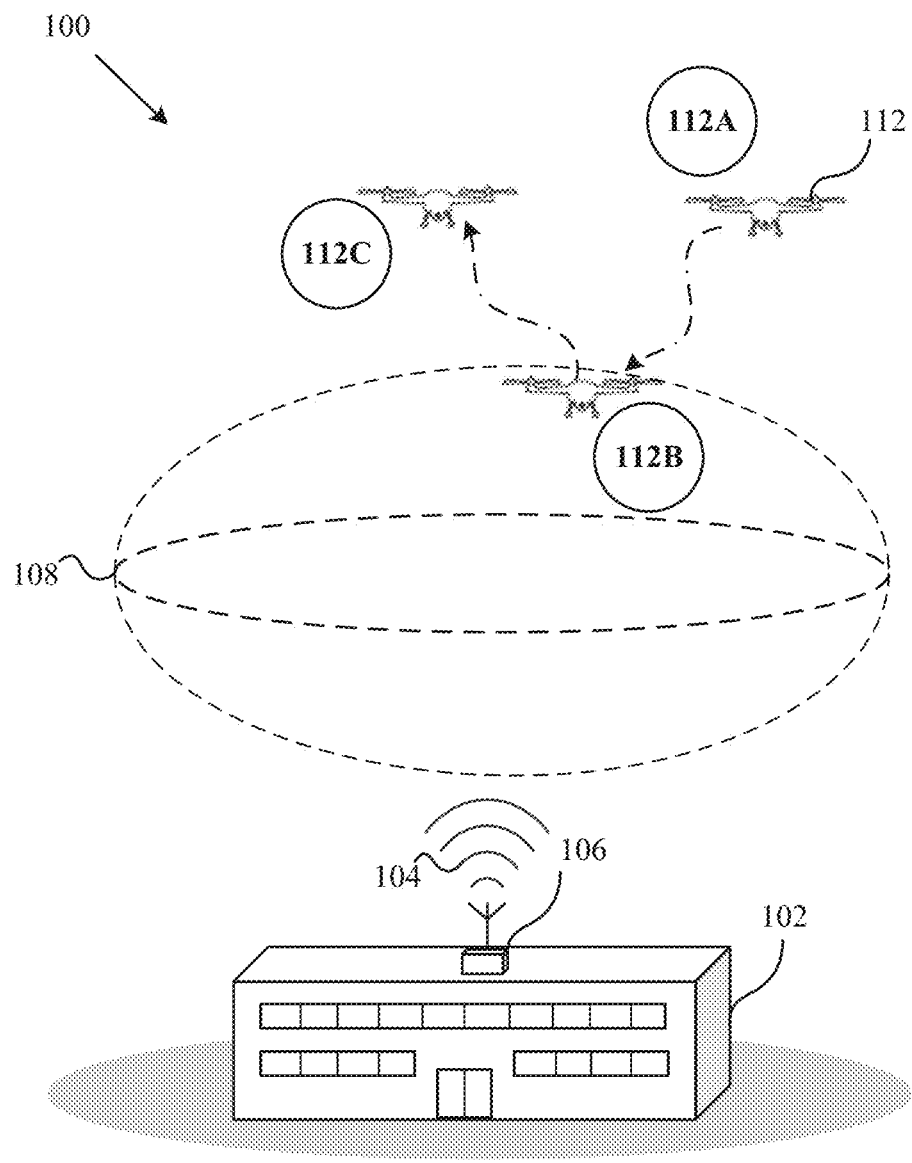
FIG. 1 is an exemplary operational environment, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to systems, methods, apparatuses, and devices for identifying, tracking, managing, and deterring unmanned aerial vehicles (UAVs) using a plurality of sensors, hardware, and software. In one embodiment, and in accordance with aspects of the present disclosure, a plurality of sensors including at least radar, video, audio, Wi-Fi, infrared, and radio frequency (RF) sensors, collect data from their surrounding environments in order to detect, identify, track, and manage UAVs. In a particular embodiment, one or more sensors/devices transmits and/or receives automatic dependent surveillance broadcast ("ADS-B") signals to and from UAVs, or other aircrafts. In general, ADS-B technology allows for aircrafts to broadcast signals including location data (and other data) to other nearby aircrafts, UAVs, and ADS-B receivers, and to receive signals from those aircrafts/UAVs. Accordingly, ADS-B signals alert aircrafts (or other interested parties) about locations of other nearby aircrafts so that each aircraft can safely occupy their respective airspace by maintaining a safe distance from the flight paths indicated by the ADS-B signals.

According to various aspects of the present disclosure, the system discussed herein may generate one or more fabricated, or "spoofed," ADS-B signals at a location on or near the ground (or otherwise not from an aircraft) for deterring UAVs or other aircrafts. For example, the system may emanate a fabricated ADS-B signal from or near a structure or building. In response to a UAV or aircraft approaching the structure or building, the UAV or aircraft (if equipped with an ADS-B receiver) may receive the ADS-B signal and furthermore avoid the airspace surrounding the structure or building, as the UAV or aircraft interprets the ADS-B signal as indicating "occupied" airspace. In some embodiments, ADS-B equipped aircrafts may be restricted or prohibited (e.g., lawfully) from entering certain airspaces from which an ADS-B signal is emanating (indicating an aircraft presence).

In particular embodiments, the "spoofed" ADS-B signals may include an encoded global positioning system ("GPS") signal position representative of a fabricated aircraft location, such that any aircraft receiving the ADS-B signal would interpret the ADS-B signal as emanating from the fabricated aircraft, thus establishing a "virtual" or fabricated location which the aircraft should avoid. In one embodiment, this fabricated aircraft location may be miles (e.g., 5 miles, 10 miles, 100 miles, etc.) away from the location from which the ADS-B signal was emanated. Furthermore, in at least one embodiment, the ADS-B signals may encapsulate distances ranging hundreds of miles. Accordingly, an approaching aircraft may detect an ADS-B signal hundreds of miles away from the position from which it was emanated, and the ADS-B signal may represent a fabricated aircraft located only a few miles away from the approaching aircraft.

As will be discussed in greater detail herein, the systems, methods, apparatuses, and devices efficiently and optimally protect particular airspaces via unique ADS-B fabricating techniques. The fabricating techniques include generating an ADS-B signal via methods such as hardcoding GPS data into the signal, or capturing real-time GPS data via a GPS sensor positioned at a particular location near the airspace to be protected. Furthermore, the system may emanate a plurality of ADS-B signals from a single sensor, where each of the plurality of ADS-B signals includes GPS data for a different location, such that a single sensor effectively protects a plurality of geographical areas based on fabricated GPS data.

Referring now to the figures, and for the explanation of the fundamental processes and components of the disclosed systems, methods, apparatuses, and devices, reference is made to FIG. 1, which illustrates an exemplary, high-level overview of one embodiment of an operational environment 100 in accordance with various aspects of the present disclosure. As will be understood and appreciated, the conceptual overview shown in FIG. 1 represents merely one approach or embodiment of the present system, and other aspects are used according to various embodiments of the present system.

In one embodiment, the exemplary operational environment 100 includes a building 102 with signals 104 emanating from the building 102. However, in certain embodiments, the operational environment 100 may also include other objects, structures, general geographic areas, etc., from which the signals 104 emanate. As will be discussed in greater detail herein, the signals 104 emanating from the building 102 are generated by a UAV identification, tracking, management, and deterrence system 106. According to various aspects of the present disclosure, the system 106 may include features of the systems discussed in U.S. Pat. No. 9,805,273, filed on Oct. 31, 2017 and entitled "Systems, Methods, Apparatuses, and Devices for Identifying and Tracking Unmanned Aerial Vehicles via a Plurality of Sensors", the disclosure of which is incorporated by reference as if the same were set forth in its entirety herein. In particular embodiments, the system 106 includes sensors such as RF, infrared, Wi-Fi, GPS, and other sensors configured to detect and identify aerial objects. In one embodiment, the system 106 may also include devices such as ADS-B receivers and transmitters, as well as one or more databases and processors configured to generate ADS-B signals, as well as process signals received from other sensors (e.g., GPS sensors). Furthermore, the system may support Mode-S signals, or other similar aerial vehicle avoidance signals (such as Mode-A, Mode-C, etc.) that may be compatible with the ADS-B protocol. In some embodiments, ADS-B and Mode-S signals may be used interchangeably, or in combination. For example, Mode-S operates at 1090 MHz and Mode-S transponders generally transmit/receive altitude and identification data, while ADS-B also operates at 1090 MHz and generally transmits/receives GPS data. Accordingly, and in various embodiments, the altitude and identification data provided by Mode-S signals, and the GPS data provided by ADS-B signals, allows for aerial vehicles to avoid the airspace locations indicated within the signals.

Generally, ADS-B signals are safety-related signals transmitted and received between aircrafts and aircraft monitoring systems (e.g., airports, air traffic control, etc.) for communicating their respective locations (and other location/flight related data such as speed, headings, etc.). In one embodiment, the ADS-B signals may be generated by proprietary hardware, or they may be generated via off-the-shelf hardware similar to the ADS-B transmitter model number GDL-82 manufactured by Garmin Ltd. Specific technical details, requirements, and regulations relating to ADS-B signals and supporting hardware may be found at least in 14 C.F.R. § 91.227, Technical Standard Order ("TSO") number C166b, entitled "Extended Squitter Automatic Dependent Surveillance—Broadcast (ADS-B) and Traffic Information Service—Broadcast (TIS-B) Equipment Operating on the Radio Frequency of 1090 Megahertz (MHz)," and generally in the Next Generation Air Transportation System ("Next-Gen") resources published by the Federal Aviation Administration. In particular embodiments, ADS-B signals are generated based on satellite positioning data (e.g., GPS)

received at the ADS-B signal generators installed within planes, helicopters, or other aerial vehicles (manned or unmanned). In a primary embodiment of this disclosure, and as will be discussed in greater detail below, the signals 104 emanating from the building 102 are ADS-B signals.

Continuing with FIG. 1, the exemplary operational environment 100 further illustrates a "zone of deterrence" 108. In various embodiments, the zone of deterrence 108 is a region in an airspace near the system 106 where, if an aircraft were to enter the zone of deterrence 108, the aircraft would receive the signals 104 (e.g., the ADS-B signals) and accordingly reroute or otherwise avoid the zone of deterrence 108. As the zone of deterrence 108 is established by the emanated signals 104 (which may be emanated in all directions simultaneously, or in a more focused direction), the range of the zone of deterrence 108 may be substantially spherical in shape, or occupy any three dimensional volume in the airspace, and the zone of deterrence 108 should not be limited by the embodiments as shown herein. As discussed briefly above, the ADS-B signals 104 emanated from the system 106 are generally recognized and interpreted by aircrafts as safety-related warning signals emanated from other aircrafts for communicating occupied (and thus prohibited) airspaces. Accordingly, if a first aircraft receives an ADS-B signal from a second aircraft while approaching a particular airspace, the first aircraft may determine that the approaching airspace is already occupied by the second aircraft, and the particular airspace should be avoided (e.g., for safety reasons).

In response to the growing popularity of UAVs, ADS-B receivers and transmitters are increasingly becoming integrated within UAV hardware, and thus the operation of such UAVs may be physically limited to areas where no ADS-B signals are present, or UAVs may be restricted from approaching airspaces indicated as being occupied (via ADS-B) by another aircraft. For example, if ADS-B signals are being emanated from an airport, a UAV being controlled near the airport may be prohibited from executing operating instructions to further approach the airport due to the received ADS-B signals, and furthermore in response to preconfigured restrictions integrated into UAV's hardware and software. In certain embodiments, ADS-B signals do not always prohibit aircrafts from travelling around the area from which they are emanated. According to various aspects of the present disclosure, ADS-B signals include an encoded GPS location theoretically representative of the location from which it was emanated. Thus, in certain embodiments, the GPS data in an ADS-B signal may be fabricated to represent an aircraft located elsewhere (e.g., not at or around the location from which the ADS-B signal was emanated). Accordingly, an aircraft receiving the ADS-B signal would effectively avoid the location indicated by the GPS data encoded within the ADS-B signal.

In one embodiment, the example discussed immediately above is illustrated in FIG. 1. Referring specifically to the trail of UAV positions 112A-112C, the UAV's flight path is altered in response to entering the zone of deterrence 108. In one embodiment, at position 112A, the UAV 112 is approaching the zone of deterrence 108 (and has not received the ADS-B signals 104). In various embodiments, the UAV operator may be a recreational UAV flyer, a malicious UAV flyer, the UAV may be operating according to a preprogrammed flight path, or the UAV may be controlled by any other appropriate means.

In the present embodiment, the UAV is shown entering the zone of deterrence 108 at the position 112B. In response to entering the zone of deterrence 108 at the position 112B, the UAV 112 receives one or more ADS-B signals 104 from the system 106 and begins to reroute its original flight path, or otherwise avoids further entering the zone of deterrence 108. In some embodiments, the UAV 112 may include a predetermined flight response for when ADS-B signals are detected/received (e.g., reverse the previously taken flight path, perform a specific maneuver, etc.), the UAV 112 may forward the received ADS-B signal(s) to the UAV controller for restricting operating instructions that would further advance the UAV 112 within the zone of deterrence 108, or the system 106 may overtake the UAV 112 to provide redirection instructions, instructions to ground, etc.

At the position 112C, in one embodiment, the UAV 112 is shown in a redirected state avoiding the zone of deterrence 108 in response to receiving the ADS-B signal(s) 104. According to various aspects of the present disclosure, the UAV 112 may continue to redirect its flight path until ADS-B signals are no longer received.

As will be discussed in greater detail below, the system 106 may employ various methods for establishing a zone of deterrence 108, each of which provides its own unique technical advantages for deterring UAV presence in an airspace. For example, the zone of deterrence may be established by real-time GPS data received from a GPS sensor positioned near a particular airspace in which the zone of deterrence is to be established, or the zone of deterrence may be hard-coded by replicating GPS data and generating an ADS-B signal including the hard-coded coordinates.

Figure 2:
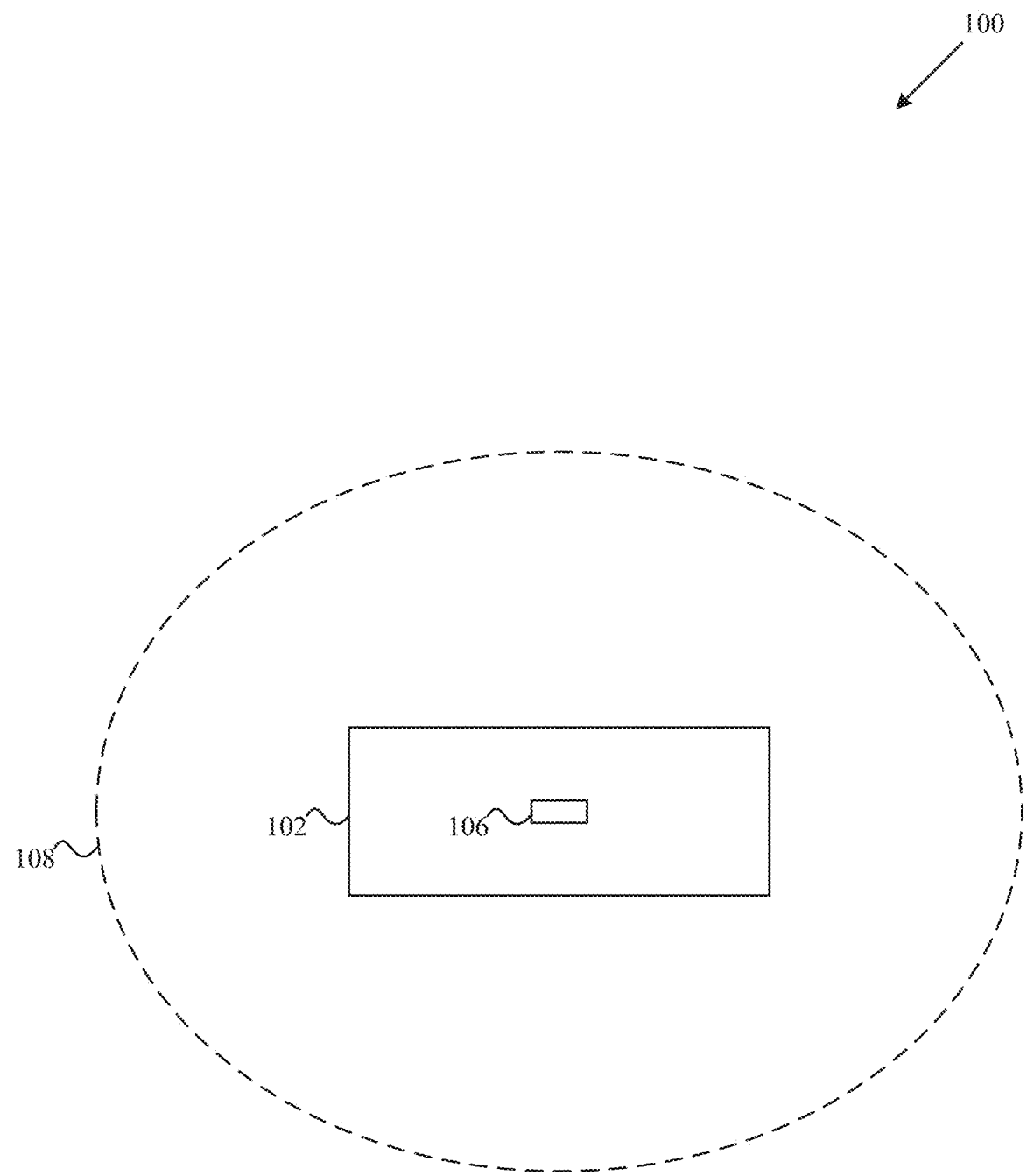
FIG. 2 is a top view of an exemplary operational environment, according to one embodiment of the present disclosure.

Turning now to FIG. 2, the building 102 with the system 106 is shown from a top view, according to one aspect of the present disclosure. In the present embodiment, the zone of deterrence 108 is shown as a single substantially-circular area surrounding the building 102, where the system 106 is located in about the center of the zone of deterrence 108.

The embodiment shown in FIG. 2 is a GPS-based embodiment, where the system 106 includes a GPS-sensor for receiving real-time GPS readings, and furthermore uses these readings to generate the ADS-B signals. According to various aspects of the present disclosure, because the GPS readings are representative of the system's physical location, the zone of deterrence 108 generally corresponds to this physical location (about the center of the building 102, in the present embodiment). In certain embodiments, a plurality of zones of deterrence may be established where a plurality of GPS sensors are positioned at separate physical locations (e.g., a 1:1 relationship between GPS sensor and zone of deterrence).

In some embodiments, the GPS readings may be modified, or the ADS-B signal(s) may be modified, to include an elevation/altitude different than the elevation detected by the GPS sensor. In various embodiments, these modifications may disguise the ADS-B signals as being propagated from an elevation at which UAVs, airplanes, helicopters, etc., would fly, thus bolstering the ADS-B signals' perceived legitimacy. According to various aspects of the present disclosure, modifying the elevation may include identifying the elevation reading in the GPS signal and replacing the elevation data with the new data (automatically or manually). In other embodiments, the elevation may be changed within the ADS-B signal packets.

Figure 3:
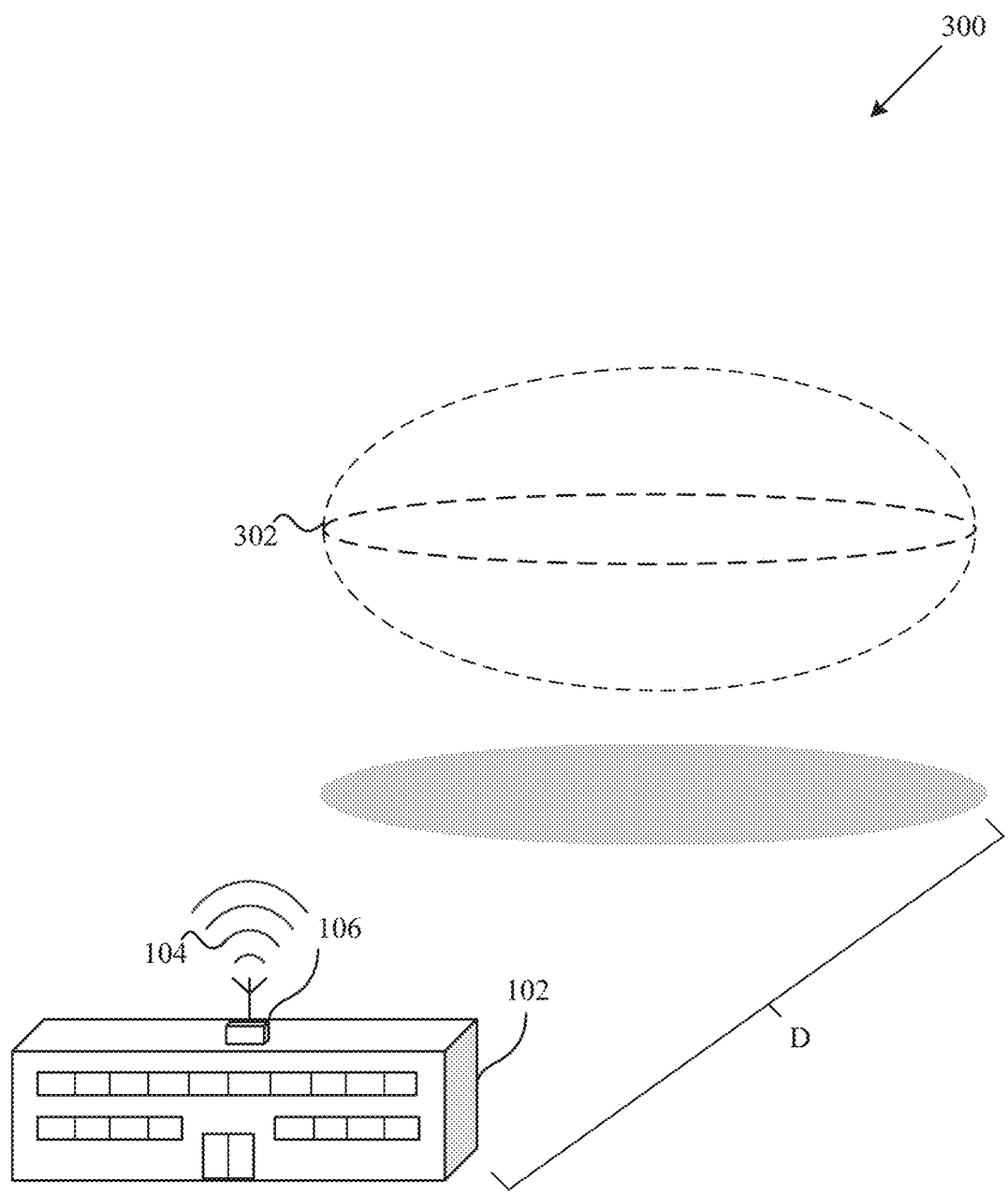
FIG. 3 is an exemplary operational environment, according to one embodiment of the present disclosure.

Referring now to FIG. 3, the building 102 and system 106 are shown with a zone of deterrence 302 located a distance "D" away from the building 102. According to various aspects of the present disclosure, the zone of deterrence 302 may be established without a real-time GPS signal from a sensor, but instead the zone of deterrence 302 may be established based on hard-coded GPS data. For example, if a prison wanted to prevent UAVs from flying directly over an open courtyard, this embodiment allows for the location of the system's ADS-B transmitter to be elsewhere (e.g., away from the courtyard for safety reasons) but the propagated signal is disguised as if it was transmitted from the courtyard. In the present embodiment, the system 106 may include a GPS sensor, but the ADS-B signal is generated using hard-coded predetermined GPS location and altitude data. Accordingly, in certain embodiments, the ADS-B signal(s) are emanated from the system 106, but a receiving UAV or aircraft will interpret the ADS-B signal(s) as being transmitted from another location, such as near the zone of deterrence 302 (e.g., the hard-coded predetermined location). Thus, the system need not deploy GPS sensors at each location where an airspace is to be protected.

Figure 4:
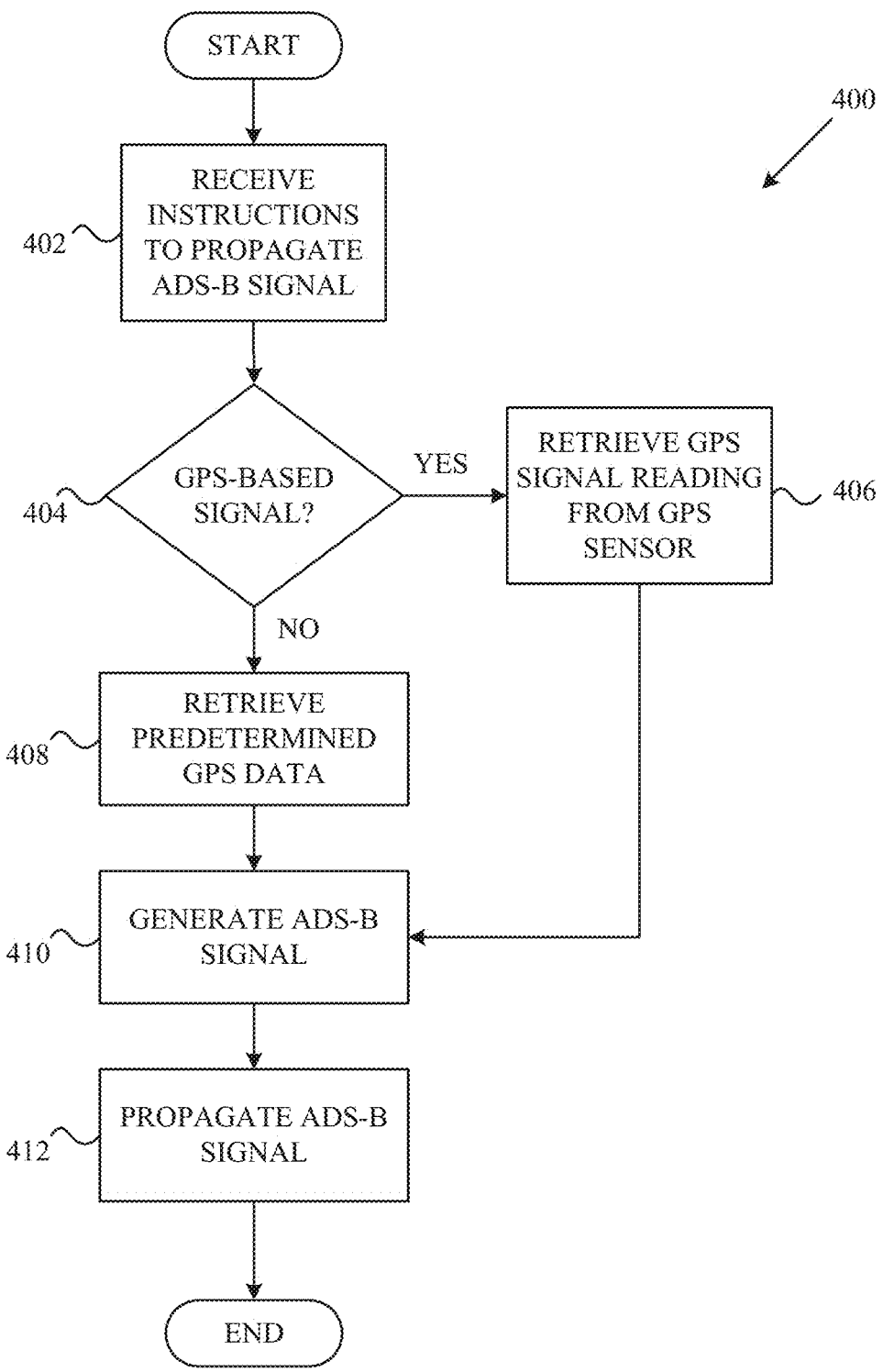
FIG. 4 is flowchart of an exemplary signal propagation process, according to one embodiment of the present disclosure.

FIG. 4 is a flowchart of an exemplary signal propagation process 400, according to one aspect of the present disclosure. In one embodiment, the process 400 begins at step 402, where the system receives instructions to propagate an ADS-B signal for establishing a zone of deterrence. In various embodiments, the instructions may be received in response to detecting a threat (e.g., a UAV) in a particular airspace, the instructions may be received according to a predetermined signal generation schedule, etc. In certain embodiments, the instructions to propagate ADS-B signals may include a particular location or airspace coordinates at which the signal is to be propagated. Furthermore, according to various aspects of the present disclosure, the instructions to propagate an ADS-B signal may include further instructions to retrieve GPS data from the system's GPS sensor at the location which the zone of deterrence is to be established. Accordingly, in particular embodiments, at step 404 the system determines if the ADS-B signal to be propagated is a GPS-based signal, or a hard-coded signal.

At step 404, if it is determined that the ADS-B signal is to be generated based on GPS data, the process may proceed to step 406, where the GPS data is retrieved from the GPS sensor. Otherwise, if the ADS-B signal is to be generated based on hard-coded data, the process proceeds to step 408, where the system retrieves the hard-coded data. In a particular embodiment, the hard-coded data may be included in the instructions to generate the ADS-B signal, or the hard-coded data may be included in a system database.

In various embodiments, at step 410, the system generates the ADS-B signal based on the received GPS signal, or the hardcoded signal data. In particular embodiments, ADS-B signals may include GPS data (latitude and longitude), aircraft pressure, altitude/elevation, callsign, track/heading, and speed information. Furthermore, ADS-B signals may be packaged as 112 bit messages separated into individual data sections, where each section includes data relating to GPS data, aircraft pressure, altitude, etc.

At step 412, in particular embodiments, the system propagates the ADS-B signal. In general, ADS-B signals are radio frequency signals propagated via pulse-position modulation ("PPM") and are transmitted over frequencies including 1090 MHz and 978 MHz. However, in various embodiments, the ADS-B signals may be propagated according to other standards.

Figure 5:
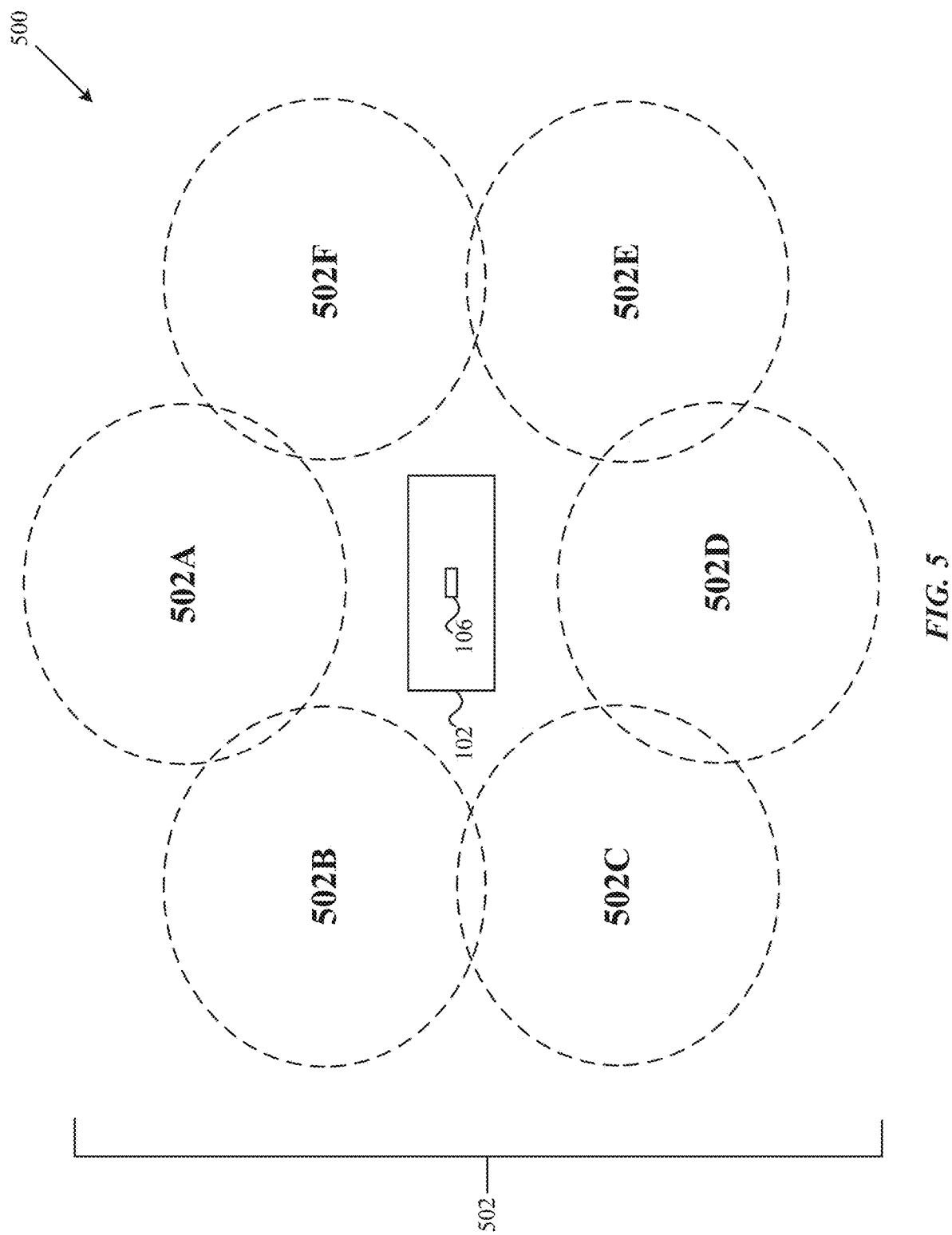
FIG. 5 is an exemplary operational environment, according to one embodiment of the present disclosure.

Turning now to FIG. 5, a plurality of zones of deterrence 502 are shown around the building 102, according to one aspect of the present disclosure. In various embodiments, the system may be configured to propagate a plurality of zones of deterrence from a single transmitter (or multiple transmitters), thus allowing for the plurality of zones of deterrence to partially overlap to create a combined zone of deterrence.

In one embodiment, the system may include a database storing at least an index (or other type of list, array, vector, table, etc.) of predetermined locations, where each predetermined location corresponds to a zone of deterrence and its corresponding ADS-B signal data. Furthermore, the system may be configured to iterate and/or loop through the index of predetermined locations for generating the ADS-B signals based on each of the predetermined locations. In certain embodiments, the system may generate and emanate ADS-B signal packets, where each packet corresponds to a particular predetermined location. In at least one embodiment, each packet may be transmitted in about a microsecond or less (e.g., 0.1 microseconds, 0.5 microseconds, 1 microsecond, 2 microseconds, etc.), and a plurality of packets corresponding to a plurality of predetermined locations may be transmitted sequentially. For example, a plurality of packets may be transmitted over a predetermined time interval (e.g., 0.05 seconds, 0.1 seconds, 0.25 seconds, 0.5 seconds, 1 second, 10 seconds, etc.), for establishing a combined zone of deterrence.

In another embodiment, the system may emanate an ADS-B signal packet for creating the zone of deterrence 502A for 0.5 microseconds, then emanate the ADS-B signal for creating the zone of deterrence 502B for 0.5 microseconds, continuing this process until the ADS-B signal for the zone of deterrence 502F has been created and emanated. In a particular embodiment, rapidly repeating this cycle of sequentially generating multiple zones of deterrence creates more than one zone of deterrence detectable at a particular time. In various embodiments, the predetermined time period or interval for propagating the signals can be shortened, thus decreasing the total time for generating and propagating each signal, which creates the effect of multiple zones of deterrence combined into the single aggregated zone of deterrence 502.

In some embodiments, an aircraft (such as a UAV) may only need to receive a single ADS-B signal or packet to trigger a redirection process. Therefore, rather than continuously propagating each ADS-B signal, the system may momentarily propagate and cycle through a plurality of ADS-B signals, where each signal is propagated for a predetermined amount of time without compromising the overall security of the airspace. Accordingly, the system 106 may generate a plurality of zones of deterrence with only one device or system 106, thus protecting a substantial airspace with limited equipment. This process is described in greater detail below, in association with the discussion of FIG. 6.

Figure 6:
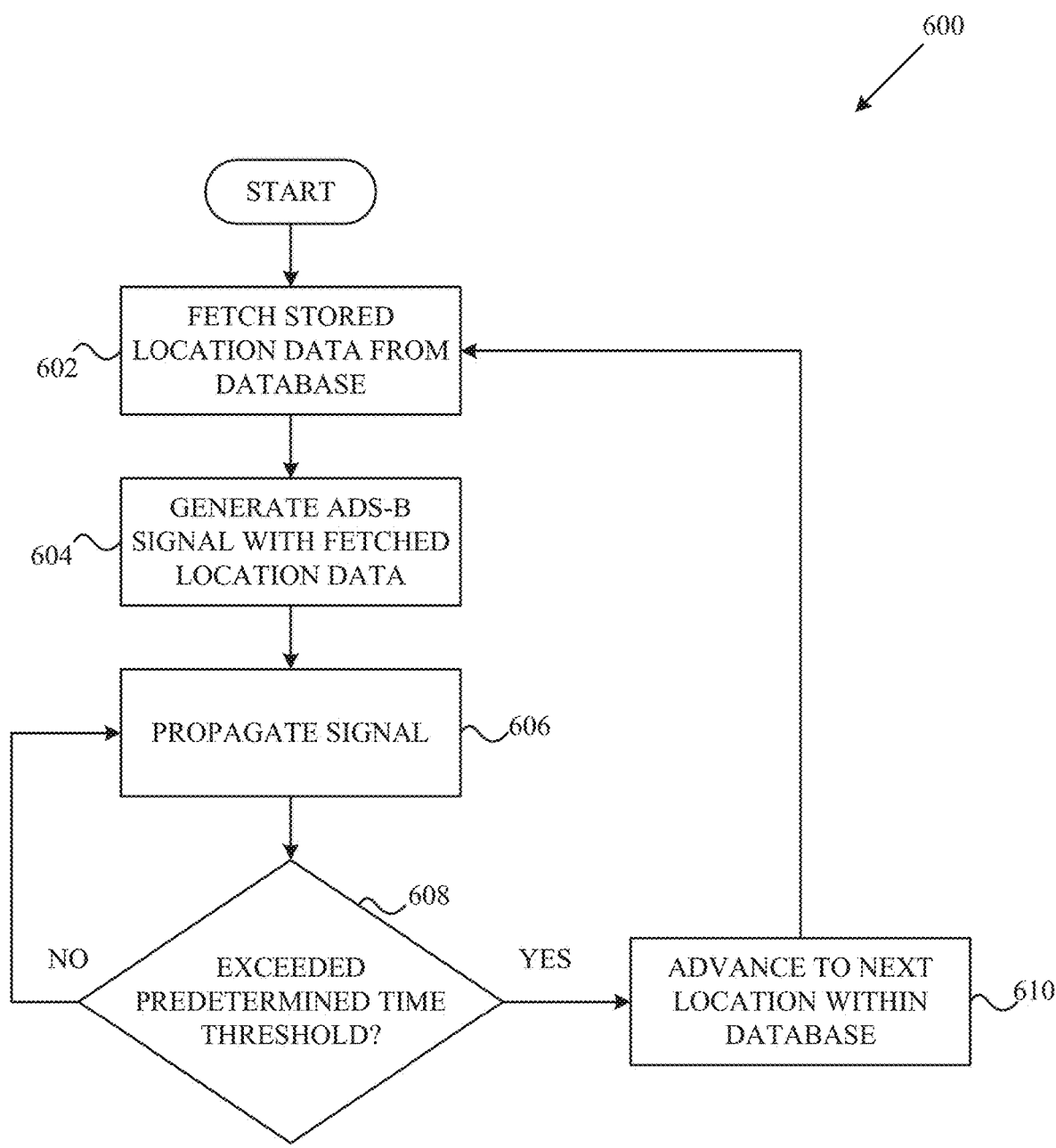
FIG. 6 is a flowchart of an exemplary signal propagation process, according to one embodiment of the present disclosure.

In one embodiment, FIG. 6 is a flowchart of an exemplary signal propagation process 600. Briefly mentioned immediately above, the system may generate and propagate a plurality of ADS-B signal packets over a predetermined time interval, each packet corresponding to a different location, thereby allowing the system to establish a larger zone of deterrence corresponding to the plurality of different ADS-B signals.

In various embodiments, the process 600 begins at step 602, where the system retrieves the location coordinates/data from the system database. In one embodiment, the database may store the location data in an index, array, vector, table, or the like, allowing for the data to be easily referenced. In certain embodiments, the location data may be stored with metadata indicating a particular organization or building to which the location data relates. According to various aspects of the present disclosure, the location data includes GPS data as well as other data for completing generation of the ADS-B signal.

At step 604, the system proceeds to generate the ADS-B signal based on the location coordinates retrieved from the database. In a particular embodiment, generating the ADS-B signal may include packaging the location data (and other data such as speed, course, altitude, callsign, and an identifier) in the particular ADS-B packet format. In certain embodiments, a plurality of ADS-B packets may be generated and stored together, for sequentially transmitting the packets over a predetermined time interval. In a particular embodiment, at step 606, the system propagates the ADS-B signal packets to establish the zone(s) of deterrence with respect to the retrieved location coordinates. In certain embodiments, the signals may be propagated in a particular direction, or the signals may be propagated such that they are emanated over a wide area.

Proceeding now to step 608, the system determines if the signal transmission has completed. In some embodiments, each ADS-B signal (or plurality of ADS-B packets) may transmit for a predetermined amount of time, and the system may determine if the predetermined amount of time has elapsed (e.g., the system queries a transmission timer, or the like). In one embodiment, if the ADS-B packet transmission is not completed, the process returns to the step 606, where the system continues to propagate the ADS-B signal(s). However, if the system determines that the transmission has completed (e.g., a predetermined time period/interval as elapsed), the process may proceed to step 610, where the system retrieves the next set of location coordinates from the database for generating and transmitting a new set of ADS-B packets. According to various aspects of the present disclosure, the system may continue this process indefinitely, or until the system receives an instruction to terminate the ADS-B signal transmission cycle.

Figure 7:
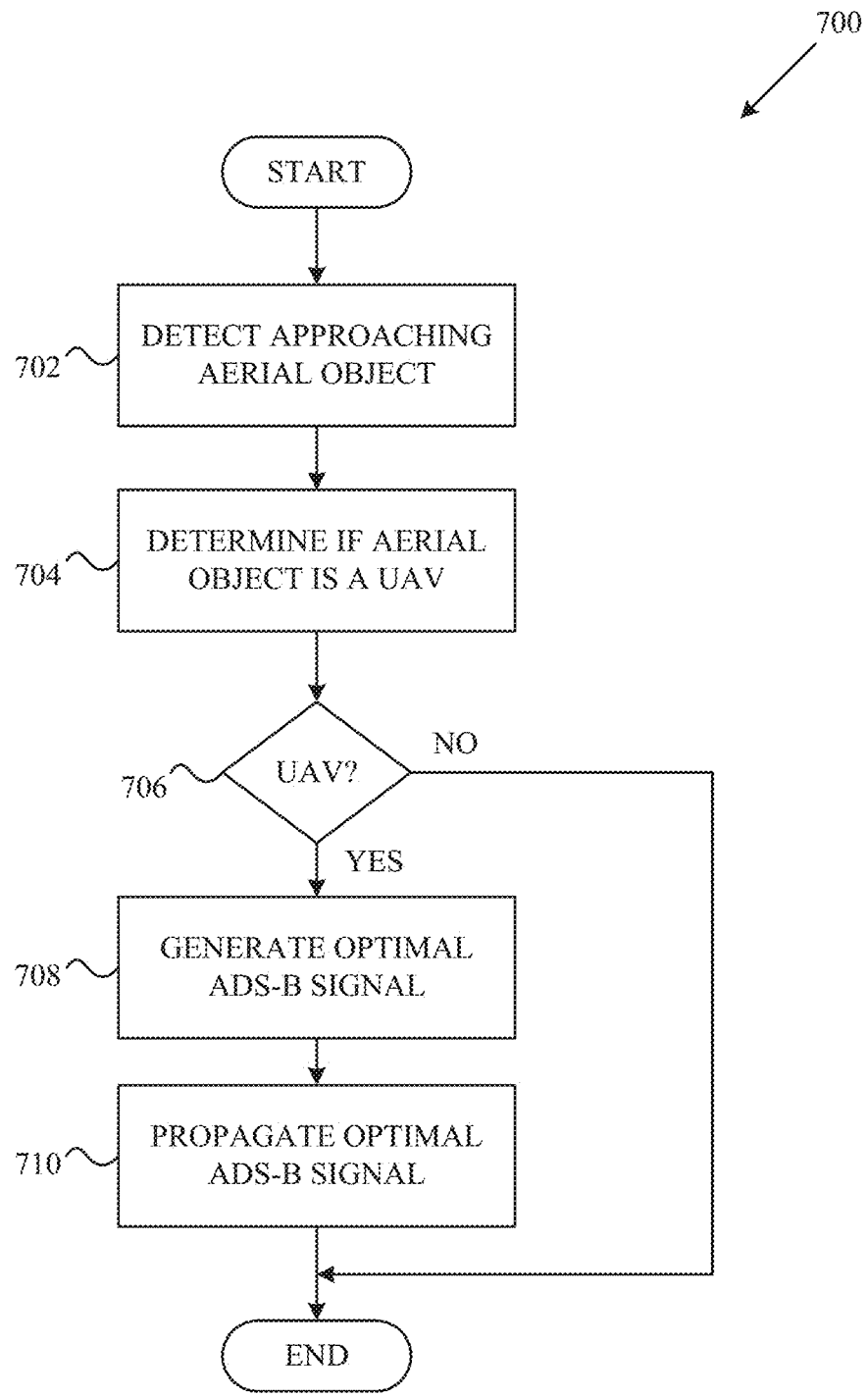
FIG. 7 is a flowchart of an exemplary optimized propagation process, according to one embodiment of the present disclosure.

FIG. 7 is a flowchart of an optimized propagation process 700, according to one aspect of the present disclosure. In various embodiments, for reducing unnecessary system processing, the system may optimize the methods by which it determines when to propagate an ADS-B signal. In one embodiment, the system may leverage other system sensors, such as video, RF, audio, radar, etc., for determining if an aircraft is approaching a particular airspace. In response to making this determination, the system may further determine if an ADS-B signal should be generated and propagated for redirecting the detected aircraft.

In a particular embodiment, the process 700 begins at step 702, where the system detects an approaching object within a particular airspace. As mentioned briefly above, the system may detect the object by various sensor-based methods, such as processing data received by video, RF, radar, audio, and other sensors.

At step 704, according to various aspects of the present disclosure, the system determines if the detected object is a UAV or another object (such as a commercial aircraft, or a bird, etc.). As discussed in the patent application(s) incorporated by reference herein, the system may compare certain sensor readings to known UAV data to determine if the sensor readings are indicative of UAV behavior, where the final determination may be represented as a confidence measure, or the like. If, at step 706, the system determines that the detected object is not a UAV, the process 700 may terminate. However, if at step 706 the system determines that the detected object is a UAV, the system may proceed to the step 708.

In one embodiment, at step 708, the system generates an optimal ADS-B signal. According to various aspects of the present disclosure, the optimal ADS-B signal may include location data that corresponds to the present or predicted future location of the UAV (or other detected aircraft). For example, the system may determine, based on the detected UAV's speed and heading, that it should shortly enter a particular airspace. Thus, in response to detecting the UAV, the system may generate and propagate (at step 708) an ADS-B signal that establishes a zone of deterrence at the particular airspace, thus preventing the UAV from entering the particular airspace.

In various embodiments, the optimized ADS-B signal may include location data substantially similar to the location data corresponding to the detected UAV. In a particular embodiments, the optimized ADS-B signal may be propagated within an airspace that the UAV is heading, and the ADS-B signal may be generated based on speed, heading, and other detected UAV flight characteristics. In some embodiments, the optimized ADS-B signal may not be near the detected UAV, or even in its predicted flight path, but the ADS-B signal is propagated regardless as a safety precaution. In certain embodiments, the system may propagate optimized ADS-B signals for influencing new routes for detected aircrafts (e.g., if the aircraft can only redirect in a certain direction to avoid ADS-B signals). In some embodiments, the present systems and methods may further be used to capture a UAV within a ring of overlapping zones of deterrence (for example, the combined zone of deterrence shown in FIG. 5), which may provide system users with additional time to determine how to address the UAV.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein

What is claimed is:

1. A system for managing aerial vehicle occupation in a particular airspace, the system comprising:
 a database of predetermined locations, wherein each predetermined location comprises location data corresponding to particular locations within a particular airspace, and wherein the database of predetermined locations comprises at least a first location and a last location; and an ADS-B signal transmitter comprising a processor operatively connected to the database of predetermined locations, wherein the processor is operable to:

generate a first ADS-B signal based on location data corresponding to the first location, wherein the location data comprises a first particular location proximate to the particular airspace, and wherein the location data is not associated with any particular aerial vehicle in the particular airspace;

transmit the first ADS-B signal, wherein transmitting the first ADS-B signal comprises propagating the first ADS-B signal to be received by one or more aerial vehicles configured to receive ADS-B signals;

retrieve subsequent location data corresponding to a subsequent particular location from the database of predetermined locations;

generate a subsequent ADS-B signal based on the subsequent location data; and transmit the subsequent ADS-B signal over a predetermined time interval, whereby in response to receiving the first ADS-B signal and the subsequent ADS-B signal, the one or more aerial vehicles are alerted to avoid the particular airspace.

2. The system of claim 1, wherein the system further comprises a GPS sensor operatively connected to the processor and affixed to a structure with relative proximity to ground level, and wherein the location data is determined in real-time via the GPS sensor.

3. The system of claim 1, wherein the subsequent location data corresponding to the subsequent location comprises the last location in the database of predetermined locations.

4. The system of claim 3, wherein in response to transmitting the subsequent location data corresponding to the last location, retrieving again the location data corresponding to the first location for generating and transmitting the first ADS-B signal.

5. The system of claim 1, wherein the predetermined time interval comprises about 0.2 seconds.

6. The system of claim 1, wherein the first ADS-B signal and the subsequent ADS-B signal each initiate a reroute function at the one or more aerial vehicles in response to being received by the one or more aerial vehicles.

7. A method for managing aerial vehicle occupation in a particular airspace via an aerial vehicle collision avoidance signal transmitter comprising a processor, wherein the processor is operatively connected to a database of predetermined locations comprising at least a first location and a last location, and wherein the processor is configured to execute the method steps, comprising:

generating a first aerial vehicle collision avoidance signal based on location data corresponding to the first location, wherein the location data comprises a first particular location proximate to the particular airspace, wherein the location data is not associated with any particular aerial vehicle in the particular airspace, wherein the location data is retrieved from the database of predetermined locations, and wherein each location in the database of predetermined locations comprises location data corresponding to particular locations within the particular airspace;

transmitting the first aerial vehicle collision avoidance signal, wherein transmitting the first aerial vehicle collision avoidance signal comprises propagating the first aerial vehicle collision avoidance signal to be received by one or more aerial vehicles configured to receive aerial vehicle collision avoidance signals;

retrieving subsequent location data corresponding to a subsequent particular location from the database of predetermined locations;

generating a subsequent aerial vehicle signal based on the subsequent location data; and transmitting the subsequent aerial vehicle collision avoidance signal over a predetermined time interval, whereby in response to receiving the first aerial vehicle collision avoidance signal and the subsequent aerial vehicle collision avoidance signal, the one or more aerial vehicles are alerted to avoid the particular airspace.

8. The method of claim 7, wherein a GPS sensor is operatively connected to the processor and affixed to a structure with relative proximity to ground level, and wherein the location data is determined in real-time via the GPS sensor.

9. The method of claim 7, wherein the subsequent location data corresponding to the subsequent location comprises the last location in the database of predetermined locations.

10. The method of claim 9, wherein in response to transmitting the subsequent location data corresponding to the last location, retrieving again the location data corresponding to the first location for generating and transmitting the first aerial vehicle collision avoidance signal.

11. The method of claim 7, wherein the predetermined time interval comprises about 0.2 seconds.

12. The method of claim 7, wherein the first aerial vehicle collision avoidance signal and the subsequent aerial collision avoidance signal each initiate a reroute function at the one or more aerial vehicles in response to being received by the one or more aerial vehicles.

13. The method of claim 7, wherein the first aerial vehicle collision avoidance signal and the subsequent aerial collision avoidance signal each comprise ADS-B and/or Mode-S signal data.

14. A system for managing aerial vehicle occupation in a particular airspace, comprising:

an aerial vehicle collision avoidance signal transmitter; and a processor operatively connected to the aerial vehicle collision avoidance signal transmitter, wherein the processor is configured to:

generate a plurality of GPS signals, each GPS signal representative of a particular geolocation at a particular distance away from a protected geolocation, and wherein a totality of the plurality of GPS signals encompass the protected geolocation; and transmit the plurality of GPS signals, wherein the plurality of GPS signals are each transmitted sequentially for a predetermined amount of time.

15. A system for managing aerial vehicle occupation in a particular airspace, the system comprising:

a database of predetermined locations, wherein each predetermined location comprises location data corresponding to particular locations within a particular airspace, and wherein the database of predetermined locations comprises at least a first location and a last location; and an ADS-B signal transmitter comprising a processor operatively connected to the database of predetermined locations, wherein the processor is operable to:

generate a first fabricated ADS-B signal based on location data corresponding to the first location, wherein the location data comprises a first particular location proximate to the particular airspace, and wherein the location data is not associated with any particular aerial vehicle in the particular airspace;

transmit the first fabricated ADS-B signal, wherein transmitting the first fabricated ADS-B signal comprises propagating the first fabricated ADS-B signal to be received by one or more aerial vehicles configured to receive ADS-B signals;

retrieve subsequent location data corresponding to a subsequent particular location from the database of predetermined locations;

generate a subsequent fabricated ADS-B signal based on the subsequent location data; and transmit the subsequent fabricated ADS-B signal over a predetermined time interval, whereby in response to receiving the first fabricated ADS-B signal and the subsequent fabricated ADS-B signal, the one or more aerial vehicles are alerted to avoid the particular airspace.

16. A method for managing aerial vehicle occupation in a particular airspace via an aerial vehicle collision avoidance signal transmitter comprising a processor, wherein the processor is operatively connected to a database of predetermined locations comprising at least a first location and a last location, and wherein the processor is configured to execute the method steps, comprising:

generating a first fabricated aerial vehicle collision avoidance signal based on location data corresponding to the first location, wherein the location data comprises a first particular location proximate to the particular airspace, wherein the location data is not associated with any particular aerial vehicle in the particular airspace, wherein the location data is retrieved from the database of predetermined locations, and wherein each location in the database of predetermined locations comprises location data corresponding to particular locations within the particular airspace;

transmitting the first fabricated aerial vehicle collision avoidance signal, wherein transmitting the first fabricated aerial vehicle collision avoidance signal comprises propagating the first fabricated aerial vehicle collision avoidance signal to be received by one or more aerial vehicles configured to receive aerial vehicle collision avoidance signals;

retrieving subsequent location data corresponding to a subsequent particular location from the database of predetermined locations;

generating a subsequent fabricated aerial vehicle signal based on the subsequent location data; and transmitting the subsequent fabricated aerial vehicle collision avoidance signal over a predetermined time interval, whereby in response to receiving the first fabricated aerial vehicle collision avoidance signal and the subsequent fabricated aerial vehicle collision avoidance signal, the one or more aerial vehicles are alerted to avoid the particular airspace.

* * * * *